(12) United States Patent
Calvarese et al.

(10) Patent No.: US 9,891,308 B2
(45) Date of Patent: Feb. 13, 2018

(54) ARRANGEMENT FOR, AND METHOD OF, ENHANCING THE ACCURACY OF POSITION DETECTION AND TRACKING OF A MOBILE DEVICE MOVABLE IN A VENUE

(71) Applicant: SYMBOL TECHNOLOGIES, LLC, Lincolnshire, IL (US)

(72) Inventors: Russell E. Calvarese, Stony Brook, NY (US); Richard J. Lavery, Huntington, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 432 days.

(21) Appl. No.: 14/812,632

(22) Filed: Jul. 29, 2015

(65) Prior Publication Data
US 2017/0031001 A1    Feb. 2, 2017

(51) Int. Cl.
*G01S 5/26* (2006.01)
*G01S 5/22* (2006.01)

(52) U.S. Cl.
CPC . *G01S 5/26* (2013.01); *G01S 5/22* (2013.01)

(58) Field of Classification Search
CPC ..................................... G01S 5/26; G01S 5/22
See application file for complete search history.

(56) References Cited

U.S. PATENT DOCUMENTS

| 7,178,396 | B2 | 2/2007 | Carkner et al. | |
| 8,995,228 | B2 * | 3/2015 | Calvarese | G01S 5/28 367/127 |
| 9,151,826 | B2 * | 10/2015 | Lavery | G01S 5/22 |
| 9,791,546 | B2 * | 10/2017 | Calvarese | G01S 5/26 |
| 2013/0213112 | A1 | 8/2013 | Calvarese | |
| 2015/0036462 | A1 | 2/2015 | Calvarese | |
| 2015/0043309 | A1 | 2/2015 | Calvarese | |
| 2017/0031001 | A1 * | 2/2017 | Calvarese | G01S 5/26 |

FOREIGN PATENT DOCUMENTS

| EP | 2169422 A1 | 3/2010 | |
| WO | WO-2017019190 A1 * | 2/2017 | G01S 5/26 |

OTHER PUBLICATIONS

International Search Report and Written Opinion for corresponding International Patent Application No. PCT/US2016/0371641 dated Sep. 28, 2016.

* cited by examiner

*Primary Examiner* — Daniel Pihulic
(74) *Attorney, Agent, or Firm* — Yuri Astvatsaturov

(57) ABSTRACT

A transmitter subsystem periodically transmits ranging signals at transmit times, and a receiver subsystem receives the ranging signals at receive times within a receiver window having an adjustable time duration. A real-time position of a mobile device supporting one of the subsystems is determined based on differences between the receive and transmit times. An expected arrival time for the transmitted ranging signals is determined based on the real-time position of the mobile device. Each receive time is compared with the expected arrival time to obtain a consistency rate of the ranging signals that are received by the receiver subsystem directly from the transmitter subsystem. The time duration of the receiver window is dynamically adjusted based on the consistency rate.

15 Claims, 2 Drawing Sheets

ARRANGEMENT FOR, AND METHOD OF, ENHANCING THE ACCURACY OF POSITION DETECTION AND TRACKING OF A MOBILE DEVICE MOVABLE IN A VENUE

BACKGROUND OF THE INVENTION

The present disclosure relates generally to an arrangement for, and a method of, enhancing the accuracy of position detection and tracking of a mobile device, such as a handheld data capture reader, a smartphone, a tablet, a computer, a radio, or a like electronic device, that is movable in a venue, such as a retail store, a factory, a warehouse, a distribution center, a building, or a like indoor controlled area.

It is known to deploy a real-time locationing system in an indoor venue, such as a retail store, a factory, a warehouse, a distribution center, a building, or a like controlled area, to determine the location of, and to track, a mobile device, such as a handheld data capture reader, a smartphone, a tablet, a computer, a radio, or a like electronic device. The locationing system includes a transmitter subsystem for transmitting ranging signals to a receiver subsystem in order to locate the mobile device. The ranging signals can be radio frequency (RF) signals, or optical (usually infrared) signals, or acoustic (usually ultrasound) signals. For example, one or more ultrasonic transmitters mounted at fixed locations spaced apart in the venue can be operated to determine the location of a mobile device that carries an ultrasonic receiver. Each ultrasonic transmitter transmits a plurality of ultrasonic ranging signals, preferably as ultrasonic pulses in the 20-22 kHz frequency range. The ultrasonic pulses are received by an ultrasonic receiver, e.g., a microphone, on the mobile device, thereby establishing the presence and the specific location of the mobile device within the venue, typically by using differential flight time techniques known in the art that incorporate triangulation, trilateration, multilateration, and like techniques.

Under ideal operating conditions, the transmitter subsystem periodically transmits the ranging signals directly along direct, non-folded paths to the receiver subsystem. The flight time difference between the transmit time that each ranging signal is transmitted and the receive time that each ranging signal is received along each direct path, together with the known speed of each ranging signal, are used, among other factors, to determine the distance along each direct path, and, in turn, the position of the subsystem mounted on the mobile device, and, in turn, the position of the mobile device.

Yet, the operating conditions of the known locationing systems are sometimes less than ideal. RF, optical and acoustic locationing systems are all subject to multi-path reflections and scattering of their respective ranging signals off various reflecting and/or absorbing surfaces, such as walls, ceilings, floors, curtains, windows, shelves, equipment, and myriad other objects or persons, in the venue. Sometimes their respective ranging signals are so attenuated and weak as to constitute noise. Sometimes their respective ranging signals are blocked or substantially absorbed by such surfaces. For example, optical and acoustic signals do not pass through walls. An RF system may also be subject to interference from stray RF signals. An optical system may also be subject to interference from ambient bright light. An acoustic system may also be subject to interference from ambient loud noise. A ranging signal subjected to such multi-path reflections travels from the transmitter subsystem along an indirect, reflected, folded path to the receiver subsystem. This indirect reflected path is longer than the aforementioned direct path and leads to an erroneous determination of the position of the subsystem mounted on the mobile device.

The known locationing system typically leaves its receiver subsystem turned on and enabled all during its operation. This not only allows the ranging signals traveling along the direct paths, also sometimes referred to herein as "consistent or valid" ranging signals, to be received, but also allows the ranging signals traveling along the indirect reflected paths, also sometimes referred to herein as "inconsistent or invalid" signals, to be received. The signal-to-noise ratio (SNR) of all the ranging signals being received at the receiver subsystem is therefore not optimum due to the receipt of the inconsistent ranging signals.

Accordingly, it would be desirable to dynamically control when and for how long the receiver subsystem is enabled, and to increase and optimize the SNR of the ranging signals being received at the receiver subsystem, with the goal of enhancing the accuracy of position detection and tracking of a mobile device in a venue by a locationing system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
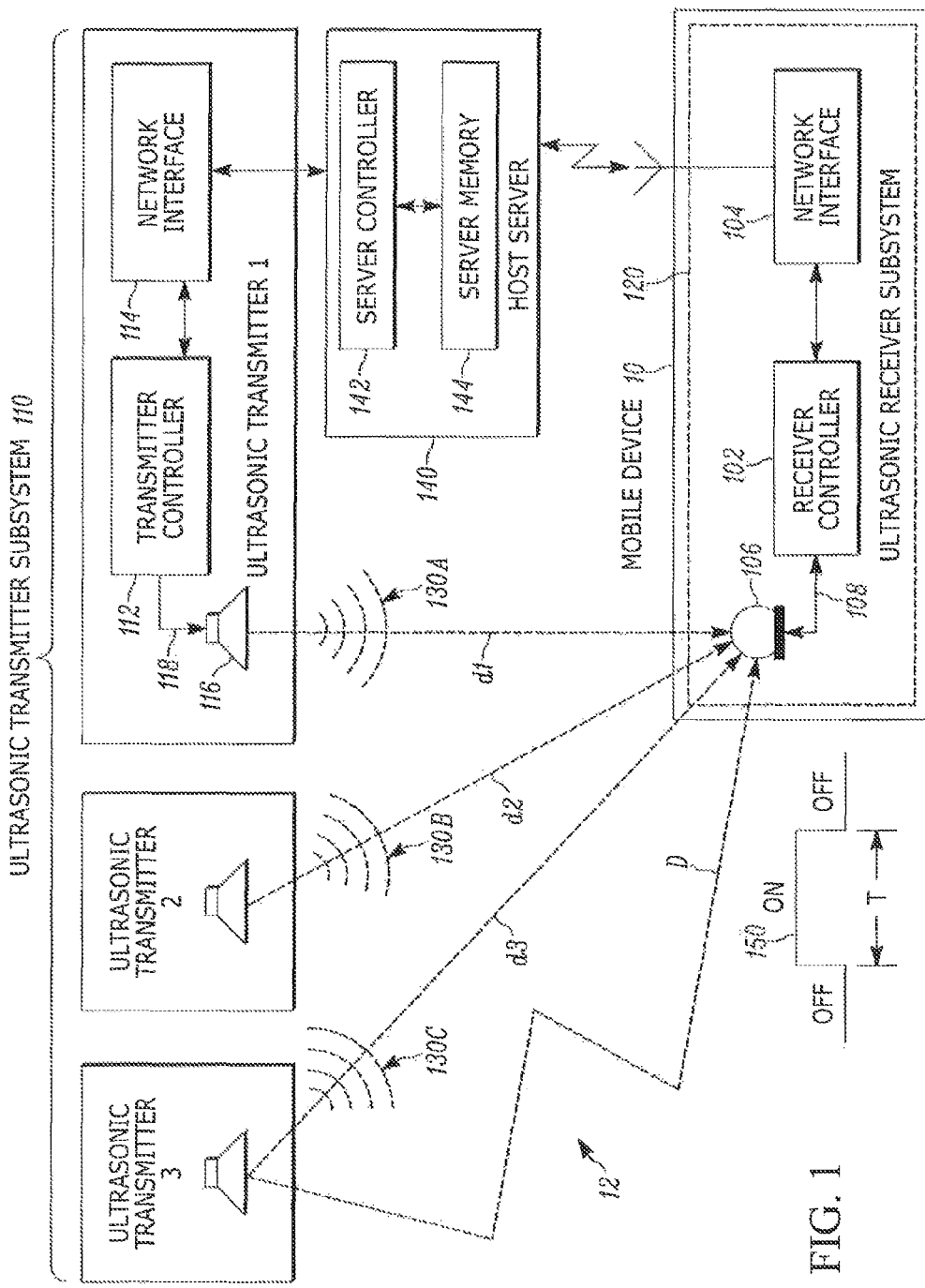
FIG. 1 is a block diagram of an arrangement for enhancing the accuracy of position detection and tracking of a mobile device in a venue in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for enhancing the accuracy of position detection and tracking of a mobile device movable in a venue. The mobile device can be any electronic device, such as a handheld radio frequency (RF) identification (RFID) tag reader, a handheld bar code symbol reader, a smartphone, a tablet, a computer, a radio, or the like. The venue can be any indoor environment, such as a retail store, a factory, a warehouse, a distribution center, a building, or a like indoor controlled area. The arrangement comprises a real-time locationing system, e.g., an ultrasonic locationing system, operatively connected to a controller. The locationing system includes a transmitter subsystem and a receiver subsystem spaced away from the transmitter subsystem. The transmitter subsystem periodically transmits a plurality of ranging signals, e.g., ultrasonic pulses, at transmit times, and the receiver subsystem receives the ranging signals at receive times within a receiver window having an adjustable time duration. One of the subsystems, e.g., the receiver subsystem, is supported by, and movable with, the mobile device in the venue.

The controller determines a real-time position of the mobile device based, among other factors, on flight time differences between the receive and transmit times, and determines an expected arrival time for the transmitted ranging signals based on the determined real-time position of the mobile device. The controller also compares each receive time with the expected arrival time to obtain a consistency rate, e.g., a number and a frequency of occurrence, of the ranging signals that are received by the receiver subsystem directly from the transmitter subsystem, i.e., the above-described consistent signals. The controller further dynamically adjusts the time duration of the receiver window based on the consistency rate. More particularly, the controller is configured to decrease the time duration of the receiver window when the consistency rate exceeds a reference threshold, and to increase the time duration of the receiver window when the consistency rate is less than the reference threshold.

Another aspect of this disclosure relates to a method of enhancing the accuracy of position detection and tracking of a mobile device movable in a venue. The method is performed by periodically transmitting a plurality of ranging signals at transmit times by operation of a transmitter subsystem, by receiving the ranging signals at receive times within a receiver window having an adjustable time duration by operation of a receiver subsystem, by spacing the subsystems apart from each other in the venue, and by supporting one of the subsystems on the mobile device for joint movement therewith in the venue The method is further performed by determining a real-time position of the mobile device based on differences between the receive and transmit times, by determining an expected arrival time for the transmitted ranging signals based on the determined real-time position of the mobile device, by comparing each receive time with the expected arrival time to obtain a consistency rate of the ranging signals that are received by the receiver subsystem directly from the transmitter subsystem, and by dynamically adjusting the time duration of the receiver window based on the consistency rate.

In accordance with this disclosure, when the consistency rate of the consistent ranging signals exceeds a threshold, say about an 80% level, then the time duration of the receiver window is decreased, i.e., the window starts to close. Conversely, when the consistency rate of the consistent ranging signals is less than the threshold, e.g., about the 80% level, then the duration of the receiver window is increased, i.e., the window starts to open. This dynamic adjustment of the receiver window optimizes the SNR.

Referring now to the drawings, reference numeral 10 identifies a mobile device 10 movable in a venue 12. The mobile device 10 can be any electronic device, such as a handheld radio frequency (RF) identification (RFID) tag reader, a handheld bar code symbol reader, a smartphone, a tablet, a computer, a radio, or the like. The venue 12 can be any indoor environment, such as a retail store, a factory, a warehouse, a distribution center, a building, or a like indoor controlled area. A real-time locationing system is provided to determine the location, and to track the position, of the mobile device 10 in the venue 12. The locationing system includes a transmitter subsystem 110 for transmitting ranging signals 130A, 130B, 130C to a receiver subsystem 120. The locationing system may employ RF signals, or optical (usually infrared) signals, or acoustic (usually ultrasound) signals to locate the mobile device 10.

In the example shown in FIG. 1, the transmitter subsystem 110 is ultrasonic and includes a plurality of ultrasonic transmitters 1, 2, 3 that are spaced apart at known fixed locations in the venue, for example, by being mounted overhead on a ceiling. The receiver subsystem 120 is also ultrasonic and is mounted on, and jointly movable with, the mobile device 10 below the ceiling. Each ultrasonic transmitter 1, 2, 3 periodically transmits the ultrasonic ranging signals 130A, 130B, 130C, preferably in short bursts or ultrasonic pulses, which are received by the ultrasonic receiver subsystem 120 on the mobile device 10. Although only three ultrasonic transmitters 1, 2, 3 have been illustrated in FIG. 1, it will be understood that many more than three could be, and often are, provided in a particular venue 12. It will also be understood that the positions of the transmitter subsystem 110 and the receiver subsystem 120 could be reversed. Thus, the receiver subsystem 120 could comprise a plurality of receivers mounted at fixed locations on the ceiling, and the transmitter subsystem 110 could comprise a single transmitter carried by the mobile device 10.

A host server 140, also known as a backend server, is operatively connected over wired and/or wireless connections to the transmitter subsystem 110, the receiver subsystem 120, and the mobile device 10. The host server 42 has a programmed microprocessor or server controller 142 that controls the subsystems 110, 120 and the mobile device 10, and a server memory 144 for storing data and programs under the control of the server controller 142.

The server controller 142 of the host server 140 is operatively connected through a network interface 114 via a programmed microprocessor or transmitter controller 112 to generate a transmit drive signal on line 118 to drive an emitter 116, preferably a voice coil speaker, but could also be a piezoelectric speaker, in each transmitter 1, 2, 3 of the transmitter subsystem 110. The non-illustrated components for ultrasonic transmitters 2 and 3 are the same as those shown for the ultrasonic transmitter 1. The server controller 142 directs all the ultrasonic transmitters 1, 2, 3 to emit the ultrasonic ranging signals 130A, 130B, 130C at different staggered times such that the receiver subsystem 120 on the mobile device 10 will not receive overlapping ranging signals from the different ultrasonic transmitters.

The receiver subsystem 120 includes a transducer, such as an existing microphone 106, on the mobile device 10 to receive and convert each ultrasonic ranging signal 130A, 130B, 130C to an electrical signal on line 108 that is processed by an existing programmed microprocessor or receiver controller 102. A network interface 104 at the output of the receiver controller 102 provides wireless communication with the server controller 142 of the host server 140.

Under ideal operating conditions, the transmitter subsystem 110 periodically transmits the ranging signals 130A, 130B, 130C directly along direct, non-folded paths d1, d2, d3 to the receiver subsystem 120. The flight time difference between the transmit time that each ranging signal 130A, 130B, 130C is transmitted and the receive time that each ranging signal 130A, 130B, 130C is received along each direct path d1, d2, d3, together with the known speed of each ranging signal 130A, 130B, 130C, as well as the known and fixed locations and positions of the transmitters 1, 2, 3, are all used to determine the distance along, or length of, each direct path d1, d2, d3, and, in turn, the position of the receiver subsystem 120 mounted on the mobile device 10, and, in turn, the position of the mobile device 10, using a suitable locationing technique, such as triangulation, trilateration, multilateration, etc. The host server 140 must wait for the longest possible flight time for each ranging signal 130A, 130B, 130C transmitted, for example, by the transmitter 1 to be received by the microphone 106 before having the other transmitters 2 and 3 transmit their ranging signals. If not, ranging signal collisions could occur, and some ranging signals would not be received properly, i.e. they would be missed by the microphone 106.

Therefore, it is preferred to establish a maximum flight time for the venue 12, i.e. the farthest distance apart for the transmitter and receiver subsystems 110, 120 where the microphone 106 is still able to reliably receive (hear) each ultrasonic ranging signal. In other words, ranging signals may not readily be detected at long distances, such as those of a large hall. Therefore, a reasonable maximum flight time can be established, such as 200 ms, which is approximately 200 feet for the ultrasonic ranging signals. This maximum flight time can be estimated or empirically determined in the actual venue 12. Therefore, to ensure that ultrasonic ranging signals are not missed, a worst case flight time is determined within the venue 12 to define a maximum buffer time period, and to subsequently delay any ultrasonic transmitter from transmitting by at least this maximum buffer time period.

However, the operating conditions are not always ideal in practice. RF, optical and acoustic locationing systems are all subject to multi-path reflections and scattering of their respective ranging signals off various reflecting and/or absorbing surfaces, such as walls, ceilings, floors, curtains, windows, shelves, equipment, and myriad other objects or persons, in the venue. Sometimes their respective ranging signals are so attenuated and weak as to constitute noise. Sometimes their respective ranging signals are blocked or substantially absorbed by such surfaces. For example, optical and acoustic signals do not pass through walls. An RF system may also be subject to interference from stray RF signals. An optical system may also be subject to interference from ambient bright light. An acoustic system may also be subject to interference from ambient loud noise. A ranging signal subjected to such multi-path reflections travels from the transmitter subsystem 110 along an indirect, reflected, folded path, e.g., see indirect reflected path D for representative transmitter 3 in FIG. 1, to the receiver subsystem 120. The distance or length of the indirect reflected path D is longer than the distance or length of the direct path d3 of the representative transmitter 3 and leads to an erroneous determination of the position of the receiver subsystem 120 mounted on the mobile device 10.

As described above, the known locationing system typically leaves its receiver subsystem 120 turned on and enabled all during its operation. This not only allows the ranging signals traveling along the direct paths d1, d2, d3, also sometimes referred to herein as "consistent or valid" ranging signals, to be received, but also allows the ranging signals traveling along the indirect reflected paths, such as indirect reflected path D, also sometimes referred to herein as "inconsistent or invalid" signals, to be received. The signal-to-noise ratio (SNR) of all the ranging signals being received at the receiver subsystem 120 is therefore not optimum due to the receipt of the inconsistent ranging signals.

In accordance with this invention, the receiver subsystem 120 is not turned on and enabled all the time. Instead, the receiver subsystem 120 is only turned on during a receiver window 150 (see FIG. 1) whose time duration T is adjusted in dependence upon a consistency rate, i.e., the number and the frequency of occurrence, of the consistent signals being received at the receiver subsystem 120. As described below, the duration T of the receiver window 150 is decreased, i.e., the window starts to close, when the consistency rate of the consistent ranging signals exceeds a threshold, say about an 80% level, and the duration T of the receiver window 150 is increased, i.e., the window starts to open, when the consistency rate of the consistent ranging signals is below the threshold. The threshold and an initial duration of the window 150 may be stored in the server memory 144.

More particularly, the server controller 142 initially determines a real-time or current position of the mobile device 10 based, among other factors, on differences between the receive and transmit times of initial ranging signals 130A, 130B, 130C, and thereby determines the distances or lengths of the direct paths d1, d2, d3 and an expected arrival time for any subsequent ranging signals based on the determined real-time position of the mobile device 10. The server controller 142 then compares the receive time of each subsequent ranging signal with the expected arrival time to obtain the aforementioned consistency rate of the consistent ranging signals that are received by the receiver subsystem 120 directly from the transmitter subsystem 110. The comparison level or range in which the receive time of each subsequent ranging signal differs from the expected arrival time may be stored in the server memory 144. The above-described operations need not be solely performed by the server controller 142, but could also be performed and assisted by each transmitter controller 112 and the receiver controller 102.

By way of a non-limiting numerical example, if an initial ranging signal transmitted from the transmitter 3 took 100 ms to travel along the direct path d3 to the microphone 106, and if a subsequent ranging signal transmitted from the transmitter 3 took much longer than 100 ms, for example, say about 50% longer, then the server controller 142 will conclude that the subsequent ranging signal is inconsistent and traveled along an indirect reflected path, such as the longer folded path D, to the microphone 106. The server controller 142 accumulates the number and the frequency of occurrence of the consistent ranging signals, and then dynamically adjusts the time duration T of the receiver window 150 based on the number and the frequency of occurrence of the consistent ranging signals. When the number and the frequency of occurrence of the consistent ranging signals exceeds the aforementioned exemplary 80% threshold, then the duration T of the receiver window 150 is decreased. Conversely, when the number and the frequency of occurrence of the consistent ranging signals is less than the aforementioned exemplary 80% threshold, then the duration of the receiver window 150 is increased. This dynamic adjustment or tolerance of the receiver window 150 optimizes the SNR.

Figure 2:
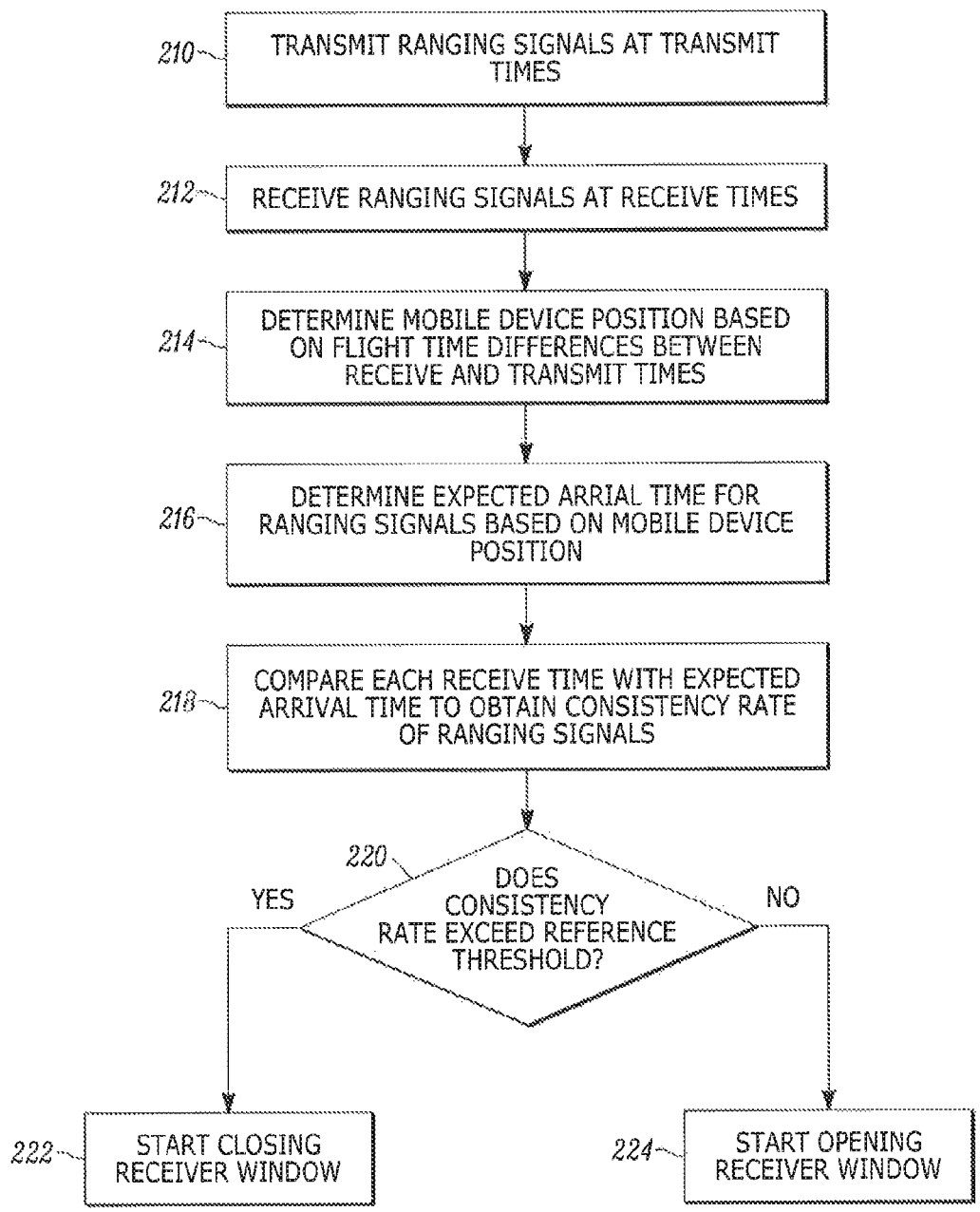
FIG. 2 is a flow chart depicting steps performed in accordance with the method of the present disclosure.

The above-disclosed method is performed, as shown in the flow chart of FIG. 2, by periodically transmitting a plurality of ranging signals 130A, 130B, 130C at transmit times by operation of a transmitter subsystem 110 in step 210, and by receiving the ranging signals 130A, 130B, 130C at receive times within a receiver window 150 having an adjustable time duration T by operation of a receiver subsystem 120 in step 212. The subsystems 110, 120 are spaced apart from each other in a venue 12, and one of the subsystems, e.g., the receiver subsystem 120, is supported on a mobile device 10 for joint movement therewith in the venue 12. The method is further performed by determining a real-time position of the mobile device 10 based on differences between the receive and transmit times in step 214, by determining an expected arrival time for the transmitted ranging signals 130A, 130B, 130C based on the determined real-time position of the mobile device 10 in step 216, and by comparing each receive time with the expected arrival time to obtain a consistency rate of the ranging signals 130A, 130B, 130C that are received by the receiver subsystem 120 directly from the transmitter subsystem 110 in step 218. In step 220, the consistency rate is compared to a reference threshold. If the consistency rate exceeds the reference threshold, then the time duration T of the receiver window 150 is decreased, and the window 150 starts to close in step 222. If the consistency rate is below the reference threshold, then the time duration T of the receiver window 150 is increased, and the window 150 starts to open in step 224.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for enhancing accuracy of position detection and tracking of a mobile device movable in a venue, the arrangement comprising:
   a real-time locationing system including a transmitter subsystem operative for periodically transmitting a plurality of ranging signals at transmit times, and a receiver subsystem spaced away from the transmitter subsystem and operative for receiving the ranging signals at receive times within a receiver window having an adjustable time duration, one of the subsystems being supported by, and movable with, the mobile device in the venue; and
   a controller operatively connected to the locationing system and operative for determining a real-time position of the mobile device based on differences between the receive and transmit times, for determining an expected arrival time for the transmitted ranging signals based on the determined real-time position of the mobile device, for comparing each receive time with the expected arrival time to obtain a consistency rate of the ranging signals that are received by the receiver subsystem directly from the transmitter subsystem, and for dynamically adjusting the time duration of the receiver window based on the consistency rate.

2. The arrangement of claim 1, wherein the other of the subsystems includes a plurality of locationing stations that are spaced apart of one another at fixed locations in the venue.

3. The arrangement of claim 1, wherein the transmitter subsystem includes a plurality of ultrasonic transmitters that are spaced apart of one another at fixed locations in the venue, each ultrasonic transmitter being operative for transmitting the ranging signals as a series of ultrasonic pulses, and wherein the receiver subsystem includes an ultrasonic receiver mounted on the mobile device and operative for receiving the ultrasonic pulses.

4. The arrangement of claim 1, and further comprising a host server for controlling the subsystems, and wherein the controller is mounted in at least one of the host server and the subsystems.

5. The arrangement of claim 1, wherein the controller is configured to decrease the time duration of the receiver window when the consistency rate exceeds a reference threshold, and to increase the time duration of the receiver window when the consistency rate is less than the reference threshold.

6. The arrangement of claim 1, wherein the controller is configured to obtain the consistency rate by determining a number and a frequency of occurrence of the ranging signals that are received by the receiver subsystem directly from the transmitter subsystem.

7. An arrangement for enhancing accuracy of position detection and tracking of a mobile device movable in a venue, the arrangement comprising:
a real-time locationing system including a transmitter subsystem having a plurality of ultrasonic transmitters that are spaced apart of one another at fixed locations in the venue, each ultrasonic transmitter being operative for periodically transmitting a plurality of ultrasonic pulses at transmit times, and a receiver subsystem having an ultrasonic receiver mounted on the mobile device away from the transmitter subsystem, the ultrasonic receiver being operative for receiving the ultrasonic pulses at receive times within a receiver window having an adjustable time duration; and
a controller operatively connected to the locationing system and operative for determining a real-time position of the mobile device based on differences between the receive and transmit times, for determining an expected arrival time for the transmitted ultrasonic pulses based on the determined real-time position of the mobile device, for comparing each receive time with the expected arrival time to obtain a consistency rate of the ultrasonic pulses that are received by the receiver subsystem from the transmitter subsystem, and for dynamically adjusting the time duration of the receiver window based on the consistency rate by decreasing the time duration of the receiver window when the consistency rate exceeds a reference threshold, and by increasing the time duration of the receiver window when the consistency rate is less than the reference threshold.

8. The arrangement of claim 7, and further comprising a host server for controlling the subsystems, and wherein the controller is mounted in at least one of the host server and the subsystems.

9. The arrangement of claim 7, wherein the controller is configured to obtain the consistency rate by determining a number and a frequency of occurrence of the ultrasonic pulses that are received by the receiver subsystem directly from the transmitter subsystem.

10. A method of enhancing accuracy of position detection and tracking of a mobile device movable in a venue, the method comprising:
periodically transmitting a plurality of ranging signals at transmit times by operation of a transmitter subsystem;
receiving the ranging signals at receive times within a receiver window having an adjustable time duration by operation of a receiver subsystem;
spacing the subsystems apart from each other in the venue;
supporting one of the subsystems on the mobile device for joint movement therewith in the venue;
determining a real-time position of the mobile device based on differences between the receive and transmit times;
determining an expected arrival time for the transmitted ranging signals based on the determined real-time position of the mobile device;
comparing each receive time with the expected arrival time to obtain a consistency rate of the ranging signals that are received by the receiver subsystem directly from the transmitter subsystem; and
dynamically adjusting the time duration of the receiver window based on the consistency rate.

11. The method of claim 10, and configuring the other of the subsystems with a plurality of locationing stations that are spaced apart of one another at fixed locations in the venue.

12. The method of claim 10, and configuring the transmitter subsystem with a plurality of ultrasonic transmitters that are spaced apart of one another at fixed locations in the venue, each ultrasonic transmitter being operative for transmitting the ranging signals as a series of ultrasonic pulses, and configuring the receiver subsystem with an ultrasonic receiver mounted on the mobile device and operative for receiving the ultrasonic pulses.

13. The method of claim 10, and controlling the subsystems with a host server.

14. The method of claim 10, wherein the adjusting is performed by decreasing the time duration of the receiver window when the consistency rate exceeds a reference threshold, and by increasing the time duration of the receiver window when the consistency rate is less than the reference threshold.

15. The method of claim 10, wherein the consistency rate is obtained by determining a number and a frequency of occurrence of the ranging signals that are received directly from the transmitter subsystem.

* * * * *